United States Patent [19]

Calkins et al.

[11] 4,092,112
[45] May 30, 1978

[54] SOIL FUMIGANT KIT

[75] Inventors: James Stewart Calkins; Alfred Nilsen, both of Midland, Mich.

[73] Assignee: The Dow Chemical Company, Midland, Mich.

[21] Appl. No.: 740,985

[22] Filed: Nov. 10, 1976

Related U.S. Application Data

[63] Continuation-in-part of Ser. No. 605,126, Aug. 15, 1975, abandoned.

[51] Int. Cl.$^2$ ............... A61L 9/04; A61L 3/00; A01M 13/00; B26F 1/32
[52] U.S. Cl. ....................... 21/108; 21/109; 30/443; 43/125; 47/58; 47/DIG. 10
[58] Field of Search ............. 21/108, 109; 43/125; 47/58, DIG. 10; 30/443, 448

[56] References Cited

U.S. PATENT DOCUMENTS

| Re. 18,799 | 4/1933 | Lichtig | 206/213 |
|---|---|---|---|
| 1,652,269 | 12/1927 | Bremner | 206/287 |
| 1,827,679 | 10/1931 | Stuart | 30/446 |
| 2,058,177 | 10/1936 | Raff | 206/213 |
| 2,092,634 | 9/1937 | Binns | 206/280 |
| 2,244,341 | 6/1941 | Maclean | 21/58 |
| 2,489,677 | 11/1949 | Robinson | 30/443 |
| 2,546,467 | 3/1951 | McBride | 30/414 |
| 2,596,892 | 5/1952 | Eckmayer | 30/411 X |
| 2,671,960 | 3/1954 | Rudd | 30/450 |
| 2,984,939 | 5/1961 | Russell | 47/58 |
| 3,096,148 | 7/1963 | Walker | 21/109 X |
| 3,538,866 | 11/1970 | Gains | 111/6 |
| 3,678,578 | 7/1972 | Patton et al. | 30/448 |

FOREIGN PATENT DOCUMENTS

| 565,951 | 4/1958 | Belgium | 30/443 |
|---|---|---|---|
| 6,613,700 | 3/1968 | Netherlands | 43/125 |

Primary Examiner—Barry S. Richman
Attorney, Agent, or Firm—Edward E. Schilling

[57] ABSTRACT

A kit for soil fumigating a seed or seedling bed which includes one or more thin-walled metal cans containing volatile fumigant and a device for puncturing the sidewall of the one or more thin-walled metal cans while under a polymeric film tarpaulin covering the seed bed. The puncturing device is a generally U-shaped bent strip of sheet metal having a substantially flat base portion and an arm portion projecting from each end of the base portion with a sharp pointed prong portion formed from the base portion and projecting therefrom about midway the ends of the base portion and in the same general direction as the substantially parallel arm portions. The base portion is long enough to space the arms apart to receive a can to be punctured, preferably in slidable frictional relation, and the arms are long enough to engage the can. The kit preferably includes a planar support element such as a piece of wooden board. It is also highly desirable to include a substantially sealable plastic bag enclosing the can and puncturing device.

5 Claims, 5 Drawing Figures

SOIL FUMIGANT KIT

CROSS REFERENCE TO RELATED APPLICATION

This application is a continuation-in-part of application Ser. No. 605,126, filed Aug. 15, 1975, now abandoned.

BACKGROUND OF THE INVENTION

1. Field of the Invention

The invention relates to a kit for fumigating a seedling bed including one or more thin-walled metal cans of volatile soil fumigant, a device for puncturing and venting each of the cans of volatile fumigant such as methyl bromide used in the fumigation of seed beds or seedling beds of only moderate size and a substantially sealable plastic bag for enclosing the cans and puncturing devices. The invention more particularly relates to a soil fumigant kit for puncturing and venting the sidewall of one or more cans of volatile fumigant under a tarpaulin over a seedling bed which kit is simple, inexpensive, relatively safe and reliable.

2. Description of the Prior Art

In fumigating small seed beds or seedling beds for the elimination of weeds, insects and worms and other soil pests, it has become frequent practice to cover the soil bed with a sheet of plastic film or tarpaulin held around the edges by soil or by a number of bricks or stones or other sufficiently heavy objects and to vent a small can of volatile soil fumigant under such cover. The fumigant is supplied in small cans such as a three piece thin-walled metal can holding a pound or a pound and a half of highly toxic soil fumigant. Venting involves the agricultural worker puncturing each can, preferably while it is under the plastic film to avoid human exposure to the generally toxic fumigant and allowing the fumigant to escape from the can in a space of a few seconds to a few minutes or more after which the fumigant is retained by the tarpaulin until it can enter the soil.

Soil fumigant kits available heretofore have been unnecessarily expensive and not uniformly satisfactory in operation. Can puncturing without a kit is not very reliable, bringing about venting at unpredictable rates, or, presenting problems of uncertainty of puncturing the can on an uncertain base or support and with some danger of tearing or puncturing the tarpaulin and exposing the agricultural worker to the toxic vapors.

It is a principle object of the present invention to provide a simple, convenient, inexpensive and effective soil fumigant kit including a device for puncturing the sidewall of each can of fumigant used which kit is readily usable under a plastic film or tarpaulin at the ground level in a seed bed or seedling bed with minimal requirements for a base or support.

SUMMARY OF THE INVENTION

In accordance with the present invention, there is provided a kit for soil fumigation of a seedling bed, covered by a polymeric film, which includes at least one thin-walled metal can of volatile fumigant and a device for puncturing the sidewall of at least one thin-walled metal can which comprises a bent strip of sheet metal having a substantially flat base portion and an arm portion projecting approximately perpendicular thereto at each end of the base portion, the arm portions being substantially parallel whereby the strip has a general U-shape as viewed in profile, and about midway the ends of the base portion a sharp pointed prong portion formed from the base portion and projecting therefrom in the same general direction as the arm portions and substantially perpendicularly to the base portion. The base portion is long enough to space the arm portions far enough apart to receive a can to be punctured, preferably in frictional engagement and the arms are preferably long enough to extend about the can to facilitate the frictional engagement and to prevent the can from rolling sideways off the prong point.

It is highly desirable to include in the kit a substantially sealable plastic bag with vent holes therein to enclose at least one can of fumigant and puncturing device for each can. A planar support may be included, also.

THE DRAWINGS

FURTHER DESCRIPTION OF THE INVENTION

Figure 1:
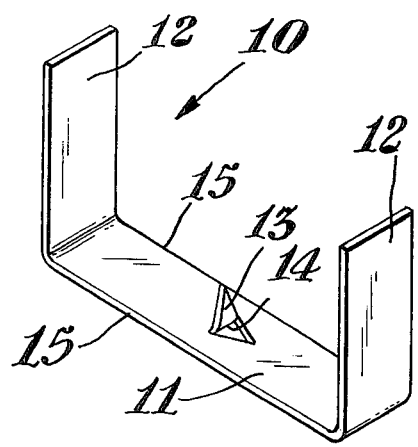
FIG. 1 is a perspective view of the puncturing device employed in the kit of the invention having the sharp pointed prong formed thereof within the base portion about midway between the edges thereof.

Referring to FIG. 1, it is seen that the can puncturing device of the kit of the invention is a thin metal strip, conveniently about ¾ to about 1½ inches (1.92 to 3.81 cm), but usually about 1 inch (2.54 cm) wide, indicated generally by the numeral 10, bent so as to be generally U-shaped in profile having a substantially flat base portion 11 and projecting arm portions 12 extending approximately perpendicular thereto and in parallel at each end of the base portion 11. A sharp pointed prong 13 has been formed from the base portion and extends substantially perpendicular thereto, the point of the prong pointing along a line substantially parallel to the projecting arms 12 and the base 14 of the prong lying along a line between the lateral edges 15 of the base portion 11 rather than along a line between the junctures of the arm portions with the base portion.

In order to most readily puncture a fumigant can pressed thereagainst, the prong or lance 13, as indicated, should extend at substantially 90° from the base portion of the puncturing device. It should also be pointed but not so slender as not to be sturdy. These requirements are met if the included angle defined by the point of the prong is in the range of about 20° to about 45°, preferably about 22° to about 30°.

The device of the invention is best made from sheet metal of suitable strength and preferably of some resistance to corrosion or rusting. Preferably the device is made from galvanized sheet steel of a weight about 16 to 20 gauge metal, more preferably 20 gauge metal sheet.

Figure 2:
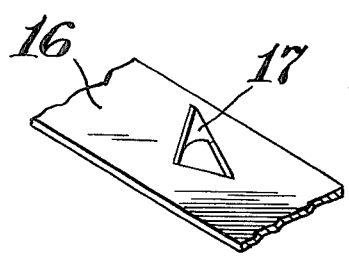
FIG. 2 is a fragmentary view of the base portion of an article similar to that shown in FIG. 1 but having the sharp pointed prong coined during the formation thereof so that the prong is curved between its lateral edges and is curved if viewed in section, rather than straight.

The fragmentary view shown in FIG. 2 depicts a portion of a base portion 16 corresponding to the base portion 11 as in FIG. 1, having formed therein and therefrom a sharp pointed prong 17 that is coined during the formation thereof so as to curve the prong between the lateral edges thereof. Such a prong describes a radial sector of the surface of the apex of a cone and thus is arcuate or curved in section rather than defining a straight line. This embodiment of the invention is preferred wherein it is desired to facilitate more rapid venting on the fumigant by providing a larger gap or aperture between the puncture opening and the prong.

Generally, it is adequate for the prong portion to project from the base portion a distance of about $\frac{1}{4}$ to about $\frac{1}{2}$ inch (0.64 to 1.28 cm), more preferably about 5/16 to about 7/16 inch (0.79 to 1.11 cm), although other prong lengths may be utilized in opening other kinds of thin-walled metal cans wherein it is convenient or desirable to open the can by puncturing the sidewall.

The fumigant cans referred to hereinabove are generally about 2½ inches (6.35 cm) in diameter and about 6 inches (15.24 cm) in length. Accordingly, the arm portions of the device are preferably spaced apart by a base portion about 2½ inches in length while the arm portions are each about 1½ to 2½ inches (3.81 to 6.35 cm) long, more preferably about 1¾ to about 2¼ inches (4.45 to 5.72 cm) in length and extending at appropriate angles from the base portion so as to frictionally engage the can to be punctured.

The prong is generally made by placing the metal strip in a die in which the prong is made by making two intersecting cuts along intersecting lines forming an apex pointing towards one of the ends of the base portion, and turning the cut portion up to form the prong.

Figure 3:
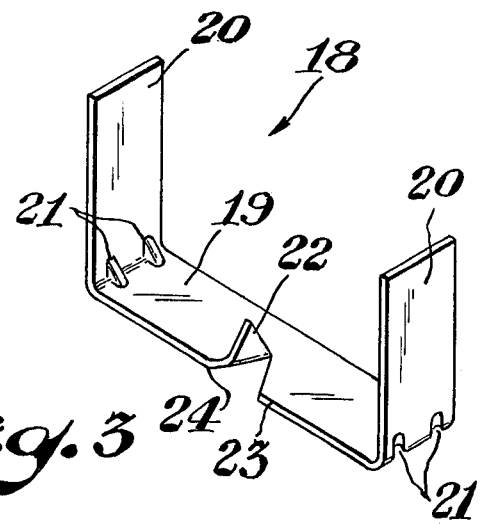
FIG. 3 is a perspective view of another embodiment of the puncturing device of the kit of the invention in which the sharp pointed prong is formed at a lateral edge of the base portion and the article has been strengthened by the formation of depressions or indentations at the outside of the radius of the bend of the strip at each end of the base to form the arms.

Referring now to FIG. 3, another embodiment of the puncturing device or lance opener of the invention is shown made up of a bent strip of metal, indicated generally by the numeral 18, the device having a substantially flat base portion 19 and, at each end, integral projecting arm portions 20. At the juncture of each arm portion 20 with the base portion 19, there are formed two depressions 21 at the external face of the radius of each such junction. These deformations serve to stiffen the device and maintain a predetermined angle between each arm portion and the base portion in order to facilitate maintenance of frictional engagement with any can placed between the arm portions 20. The number of depressions and the width and depth thereof is selected as well understood by those skilled in the metal working art in order to achieve a desired degree of stiffening. In the case of the present lance opener, it is generally adequate to utilize one or two depressions at each juncture of the arm portions with the base portion.

The prong 22 of the device shown in FIG. 3 has been made by very simply making a cut at the edge 23 of the lateral side of the base portion about midway between the ends thereof and turning up the cut portion to provide the prong 22. It is desirable that a zone 24 of the base portion under and immediately adjacent to the prong portion and on the opposite side of the prong portion 22 from the void, created when the prong portion was bent, is deformed so as to tilt the prong portion 22 transversely sufficiently that the point of the prong portion substantially defines the apex of an isosceles triangle having a base parallel to the said base portion 19, i.e., a line bisecting the angle defined by the sides of the prong extends substantially normal to the base portion 19. In this manner, the prong is positioned so that a can pressed thereagainst is more easily punctured than would be the case if the prong portion made in this manner were not tilted. If the prong is not tilted, then the longitudinal axis of symmetry of the prong will lie along a line defining a more shallow angle than perpendicular to the base portion and greater force is required to puncture a can not meeting the prong along such axis.

Figure 4:
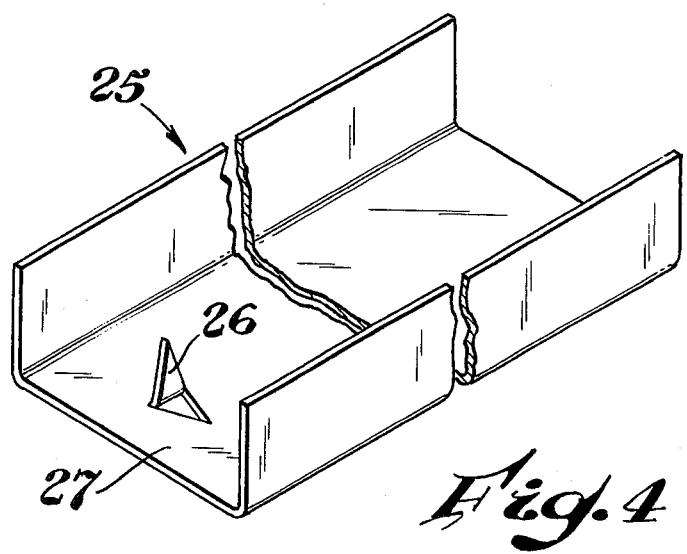
FIG. 4 is a perspective view of an additional embodiment of the puncturing device employed in the kit of the invention in which the sharp pointed prong is formed totally within the base and the device is substantially widened, i.e., elongated in the lateral direction, to provide a very substantial base for use on soft earth, thus making the use of a separate base unnecessary in most instances.

Generally, it is more desirable to use some sort of flat base, or even a receptacle with walls, to receive the device of the invention and a can to be punctured thereon. However, if it is desired to use the device itself as a base, the device may be formed of a relatively wide strip of metal. Such a device is indicated generally by the numeral 25 in FIG. 4. The device shown in FIG. 4 is substantially the same as that shown in FIG. 1, apart from the prong 26 being formed adjacent a lateral edge of the base portion 27 rather than being centered between the lateral edges thereof, and, the base portion 27 being substantially wider. The lateral width of the device shown in FIG. 4 may be most any dimension although there is little point in having the lateral width greater than about 4 to 6 inches for most contemplated usage. The greater the width, of course, the greater amount of metal sheet required and the greater the cost of the device.

Figure 5:
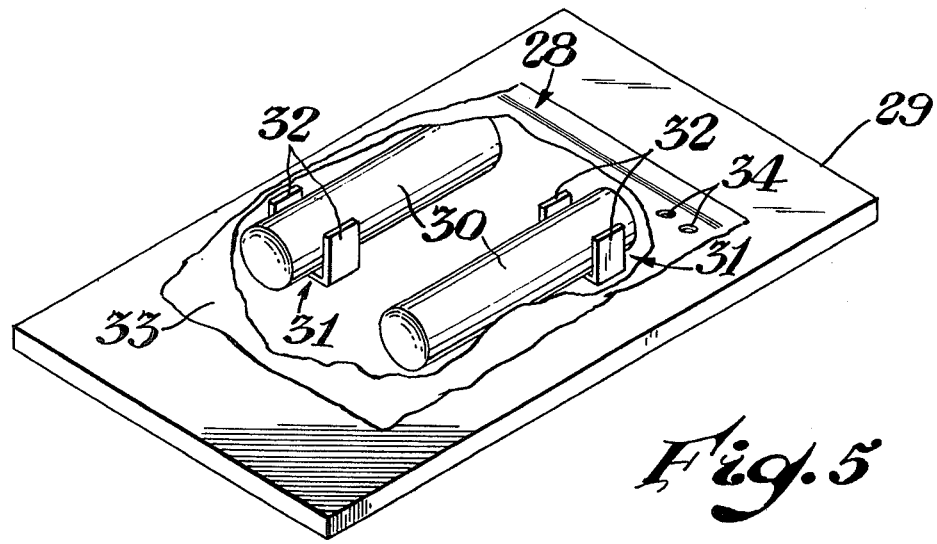
FIG. 5 is a perspective view of an assembled kit of the invention for use in soil fumigation using one or more puncturing devices according to the invention, positioned upon a base in the form of a planar member such as a piece of wooden board.

The soil fumigation kit indicated generally by the reference numeral 28 of FIG. 5 is resting on a planar support 29 which conveniently may be a piece of wooden board about 6 inches by 10 inches by ½ inch (15.24 × 25.4 × 1.27 cm) and includes two respective cans of fumigant 30 each having a device 31 according to the invention frictionally held to the respective cans by frictional engagement of the arms 32 of each device with the can it embraces adjacent an end thereof, each can being unpunctured and resting on the device in anticipation of puncturing and venting. Preferably, the arm portions 32 have a length sufficiently greater than that of the prong portion to hold the can in frictional engagement while placing the combination of can and device in position on the support 29. Both cans are positioned inside a sealable plastic bag 33 such as a ZIPLOC ® bag manufactured by The Dow Chemical Company and having about 1 gallon volume liquid capacity when inflated. Such bag must have vent holes formed therein the sidewall, such as the holes 34 shown in the drawing, which are preferably 3/16 inch diameter holes for the usage indicated in FIG. 5. The plastic bag serves as a reservoir for released liquid methyl bromide and as a volatilization chamber for subsequent fumigant vaporization, such vapors thence escaping through the vent holes shown in the drawing. The bag should have a minimum 1 gallon liquid capacity for releasing 1-3 lbs of fumigant within the bag.

If desired, one fumigant can and puncturing device may be omitted from the kit, e.g., wherein one can supplies enough fumigant for the purpose, and the wooden board base need not be employed if the underlying soil is quite firm.

We claim:

1. In a kit for fumigating a plot of soil, under a piece of substantially fumigant-impermeable polymeric film adapted to cover said plot, which kit includes at least one metal can filled with volatile soil fumigant and at least one means for puncturing each said can through the sidewall from the underside thereof, the improvement which comprises utilizing as said at least one metal can, a thin-walled metal can, and utilizing as said means for puncturing each such can a bent strip of sheet metal having a substantially flat base portion and an arm portion projecting approximately perpendicularly thereto at each end of the base portion, the pair of arm portions being substantially parallel whereby the strip has a general U-shape as viewed in profile, and about midway the ends of the base portion a sharp pointed prong portion formed from the base portion and projecting therefrom in the same general direction as the arm portions and substantially perpendicularly to the base portion, and said arm portions of each means for puncturing being adapted as a pair to embrace and frictionally engage the sidewalls of one of said metal cans between the ends thereof when pressed thereabout the sidewalls thereof prior to puncturing said can.

2. The improved kit as in claim 1 which also includes a sealable, inflatable, plastic bag capable of holding said at least one metal can and said puncturing means therefor and having a volume capacity of at least about $\frac{1}{8}$ gallon per pound of fumigant in said at least one metal can, but not over about one gallon volume, in total, said sealable plastic bag having vent holes formed in the sidewall thereof.

3. The improved kit according to claim 1 which includes two cans of soil fumigant, means for puncturing each can, said means as defined in claim 1 and a substantially sealable plastic bag with vent holes in the sidewall thereof.

4. The improved kit as in claim 3 wherein said bent strip of sheet metal is constructed of galvanized sheet steel of about 16 to about 20 gauge about one inch in width, said base portion being about $2\frac{1}{2}$ inches long and said arm portions being about $1\frac{3}{4}$ to about $2\frac{1}{4}$ inches long, said prong portion being located on said base portion entirely between the lateral edges thereof.

5. The kit as in claim 4 in which the prong portion of at least one means for puncturing projects about $\frac{1}{4}$ to $\frac{1}{2}$ inch from the base portion and the point thereof defines an included angle in the range of about 20° to about 45°.

* * * * *